United States Patent
Lin et al.

(10) Patent No.: US 9,206,573 B2
(45) Date of Patent: Dec. 8, 2015

(54) WATER FLOW REGULATING DEVICE AND OCEAN POWER GENERATING DEVICE USING THE SAME

(71) Applicant: Hangzhou LHD Institute of New Energy, LLC, Hangzhou, Zhejiang Province (CN)

(72) Inventors: Dong Lin, Hangzhou (CN); Changzheng Huang, Hangzhou (CN); Zhenghan Chen, Hangzhou (CN)

(73) Assignee: HANGZHOU LHD INSTITUTE OF NEW ENERGY, LLC, Hangzhou, Zhejiang (CN)

( * ) Notice: Subject to any disclaimer, the term of this patent is extended or adjusted under 35 U.S.C. 154(b) by 0 days.

(21) Appl. No.: 14/045,808

(22) Filed: Oct. 4, 2013

(65) Prior Publication Data
US 2014/0353972 A1    Dec. 4, 2014

(30) Foreign Application Priority Data

May 29, 2013  (CN) .......................... 2013 1 0205932

(51) Int. Cl.
*F03B 13/00*     (2006.01)
*F03B 13/10*     (2006.01)
(Continued)

(52) U.S. Cl.
CPC ................. *E02B 9/08* (2013.01); *F03B 13/264* (2013.01); *F03B 17/063* (2013.01); *F05B 2210/404* (2013.01); *F05B 2240/13* (2013.01); *F05B 2240/40* (2013.01); *F05B 2250/02* (2013.01);
(Continued)

(58) Field of Classification Search
CPC ............ F03B 3/12; F03B 13/10; F03B 13/12; F03B 13/26; F03B 15/00; F03B 17/00; H02P 2009/003; B60K 2016/00; B60L 8/00; E02B 9/08; Y02E 10/20; Y02E 10/30; Y02E 10/70; Y02E 10/763
USPC .............. 290/53, 54, 43, 42, 1 R, 7; 114/288, 114/290; 315/55; 405/76; 417/375, 417/330–333; 700/19; 60/495–502, 504
See application file for complete search history.

(56) References Cited

U.S. PATENT DOCUMENTS 3,816 A  *  11/1844  Ross .............................. 415/3.1
244,221 A  *   7/1881  Fountain ........................... 415/7
(Continued)

FOREIGN PATENT DOCUMENTS

CM      202140240 U      2/2012
CN        2858992 Y  *   1/2007
(Continued)

*Primary Examiner* — Tulsidas C Patel
*Assistant Examiner* — Charles Reid, Jr.
(74) *Attorney, Agent, or Firm* — Muncy, Geissler, Olds & Lowe P.C.

(57) ABSTRACT

The present invention provides a water flow regulating device and an ocean power generating device using the same. The water flow regulating device includes a main body, a water deflector, a rotating shaft, a winding shaft, a rope or cable, and a driving unit. The water deflector is pivotally connected with the main body. The rotating shaft is rotatably disposed at the main body. The winding shaft is disposed at the main body. One end of the rope or cable is fixed to the water deflector, and the other end bypasses the rotating shaft and the winding shaft, goes back to the water deflector and is fixed to the water deflector. The driving unit is connected with the rotating shaft to drive the rotating shaft to rotate, such that the rope or cable is driven to withdraw or release to control the water deflector to rotate.

6 Claims, 4 Drawing Sheets

(51) Int. Cl.
*H02P 9/04* (2006.01)
*F03B 13/12* (2006.01)
*E02B 9/08* (2006.01)
*F03B 13/26* (2006.01)
*F03B 17/06* (2006.01)

(52) U.S. Cl.
CPC ... *F05B 2270/1033* (2013.01); *F05B 2270/335* (2013.01); *F05B 2270/602* (2013.01); *Y02E 10/223* (2013.01); *Y02E 10/28* (2013.01); *Y02E 10/38* (2013.01)

(56) References Cited

U.S. PATENT DOCUMENTS

| | | | | |
|---|---|---|---|---|
| 326,718 A * | 9/1885 | Collins | | 415/61 |
| 419,345 A * | 1/1890 | Otto | | 415/4.2 |
| 648,442 A * | 5/1900 | Scott | | 415/4.1 |
| 735,510 A * | 8/1903 | Hergenhan | | 60/501 |
| 755,799 A * | 3/1904 | Schlueter | | 60/504 |
| 822,067 A * | 5/1906 | Mowen | | 60/716 |
| 1,003,635 A * | 9/1911 | Melander | | 415/151 |
| 1,123,054 A * | 12/1914 | Winslow | | 417/331 |
| 1,790,058 A * | 1/1931 | Morse | | 60/504 |
| 1,925,742 A * | 9/1933 | Bamber et al. | | 60/505 |
| 2,052,780 A * | 9/1936 | Lindner et al. | | 417/328 |
| 2,111,099 A * | 3/1938 | Kissel | | 60/502 |
| 2,882,687 A * | 4/1959 | Stivender | | 60/661 |
| 3,297,300 A * | 1/1967 | Mountanos | | 60/504 |
| 3,644,052 A * | 2/1972 | Lininger | | 415/7 |
| 3,807,890 A * | 4/1974 | Wright | | 415/3.1 |
| 3,883,261 A * | 5/1975 | Saxmann | | 415/7 |
| 4,043,702 A * | 8/1977 | Gotti | | 415/202 |
| 4,081,962 A * | 4/1978 | Liu et al. | | 60/501 |
| 4,123,667 A * | 10/1978 | Decker | | 290/53 |
| 4,127,356 A * | 11/1978 | Murphy | | 415/4.1 |
| 4,145,885 A * | 3/1979 | Solell | | 60/504 |
| 4,228,360 A * | 10/1980 | Navarro | | 290/43 |
| 4,242,593 A * | 12/1980 | Quilico et al. | | 290/53 |
| 4,960,363 A * | 10/1990 | Bergstein | | 415/3.1 |
| 5,359,229 A * | 10/1994 | Youngblood | | 290/53 |
| 5,664,418 A * | 9/1997 | Walters | | 60/398 |
| 6,420,794 B1 * | 7/2002 | Cao | | 290/43 |
| 6,551,053 B1 * | 4/2003 | Schuetz | | 415/3.1 |
| 6,555,931 B2 * | 4/2003 | Mizzi | | 290/54 |
| 7,388,302 B1 * | 6/2008 | Srybnik et al. | | 290/54 |
| 7,466,035 B1 * | 12/2008 | Srybnik et al. | | 290/43 |
| 8,132,406 B2 * | 3/2012 | Thompson, Jr. | | 60/496 |
| 8,232,664 B2 * | 7/2012 | Stroup et al. | | 290/55 |
| 8,333,070 B2 * | 12/2012 | Huang et al. | | 60/497 |
| 8,475,113 B2 * | 7/2013 | Unno | | 415/3.1 |
| 2008/0258467 A1* | 10/2008 | Wilson et al. | | 290/54 |
| 2009/0285667 A1* | 11/2009 | Otto | | 415/4.3 |
| 2012/0294705 A1* | 11/2012 | Unno | | 415/151 |

FOREIGN PATENT DOCUMENTS

| | | | |
|---|---|---|---|
| CN | 202140240 U | * | 2/2012 |
| CN | 202325987 U | * | 7/2012 |
| CN | 203548053 U | * | 4/2014 |
| JP | 2009-114937 | | 5/2009 |
| WO | WO 2011/095240 A2 | | 8/2011 |

* cited by examiner

WATER FLOW REGULATING DEVICE AND OCEAN POWER GENERATING DEVICE USING THE SAME

CROSS-REFERENCE TO RELATED APPLICATIONS

This Non-provisional application claims priority of Chinese Patent Application No. 201310205932.5 filed on May 29, 2013, the entire contents of which are hereby incorporated by reference.

BACKGROUND

1. Field of the Invention

The present invention relates to a regulating device and, more particularly, to a water flow regulating device and an ocean power generating device using the same.

2. Description of the Related Art

Ocean energy (including tidal current energy, ocean wave energy, and ocean current energy) refers to the mechanical energy generated by flow of sea water. As a kind of renewable energy, the ocean energy is abundant and widespread, and has extremely good development prospects and value. The ocean energy is mainly used for generating power, and the working principle of ocean energy power generation is similar to that of wind power generation and conventional hydroelectric generation. That is, the mechanical energy of the sea water is converted into electricity via an energy conversion device. Specifically, the sea water impacts hydro turbines first, and then the hydro turbines convert the energy of the water flow into the mechanical energy of rotation and drive an electric generator to generate power via a mechanical drive system. Finally, the mechanical energy is converted into electrical energy.

Nowadays, with the increasing shortage of energy and the increasing serious greenhouse effect, energy is required to be low-carbon. Thus, clean energy, such as wind energy and ocean energy (including tidal energy, the tidal current energy, the ocean wave energy, and the ocean current energy), will be the future direction of energy development. However, the power generating devices for the clean energy are still developing, and the utilization of ocean energy is still in the initial stage, except for the relatively mature wind energy utilization.

Ocean energy is unstable (in particular, the speed of the ocean current changes dramatically). The current ocean power generating devices all have problems of generating unstable power, large fluctuation, and failure to directly output and use the generated electricity.

BRIEF SUMMARY

To overcome the technical deficiencies in the prior art, the present invention provides a water flow regulating device and an ocean power generating device using the same for regulating water flow rushing to blades.

To realize one objective of the invention, the present invention provides a water flow regulating device including a main body, a water deflector, a rotating shaft, a winding shaft, a rope or cable, and a driving unit. The water deflector is pivotally connected with the main body. The rotating shaft is rotatably disposed at the main body. The winding shaft is disposed at the main body. One end of the rope or cable is fixed to the water deflector, and the other end bypasses the rotating shaft and the winding shaft, goes back to the water deflector and is fixed to the water deflector. The driving unit is connected with the rotating shaft to drive the rotating shaft to rotate, such that the rope or cable is driven to withdraw or release to control the water deflector to rotate.

According to one embodiment of the invention, the driving unit includes a motor and a speed reducer. The motor is connected with the speed reducer. The speed reducer is connected with the rotating shaft.

According to one embodiment of the invention, the water flow regulating device further includes a fixed pulley disposed at the winding shaft, and the rope or cable bypasses the winding shaft via the fixed pulley.

According to one embodiment of the invention, the water flow regulating device further includes a processing unit electrically connected with the driving unit.

According to one embodiment of the invention, the water flow regulating device further includes a stopping element disposed at the main body.

According to one embodiment of the invention, the water flow regulating device further includes a fixing element fixed to the water deflector. The two ends of the rope or cable are respectively fixed to the water deflector via the fixing element.

To realize another objective, the present invention further provides an ocean power generating device including a water flow regulating device, a hydro turbine, and an electric generator. The water flow regulating device includes a main body, a water deflector, a rotating shaft, a winding shaft, a rope or cable, and a driving unit. The water deflector is pivotally connected with the main body. The rotating shaft is rotatably disposed at the main body. The winding shaft is disposed at the main body. One end of the rope or cable is fixed to the water deflectors, and the other end bypasses the rotating shaft and the winding shaft, goes back to the water deflectors and is fixed to the water deflector. The driving unit is connected with the rotating shaft to drive the rotating shaft to rotate, such that the rope or cable is driven to withdraw or release to control the water deflector to rotate. The hydro turbine is disposed in the main body. The electric generator is connected with the hydro turbine.

According to one embodiment of the invention, the water flow regulating device further includes a processing unit electrically connected with the driving unit.

According to one embodiment of the invention, the water flow regulating device further includes a stopping element disposed at the main body.

According to one embodiment of the invention, the water flow regulating device further includes a fixing element fixed to the water deflector, and the two ends of the rope or cable are respectively fixed to the water deflectors via the fixing elements.

In conclusion, the water flow regulating device and the ocean power generating device using the same in the invention can guide the water flow to rush to the hydro turbine so as to regulate the load on the hydro turbine. Therefore, the electricity generated by the ocean power generating device can be stably output and directly used, solving problems of large fluctuation of the output power and poor stability of the traditional ocean power generating devices.

To ensure that the above mentioned and other objectives, features, and advantages of the present invention are obviously and easily understood, the following are detailed description with reference to preferable embodiments and attached drawings.

DETAILED DESCRIPTION

Figure 1:
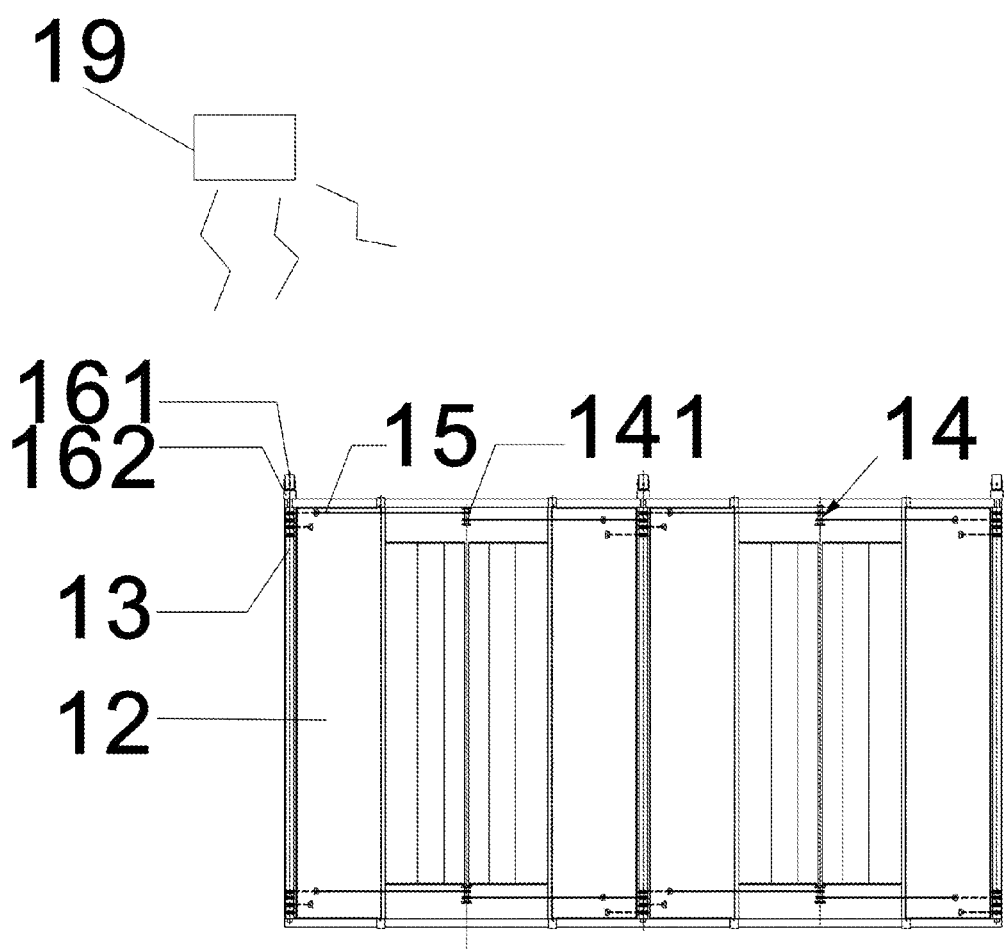
FIG. 1 is a front view showing a water flow regulating device and an ocean power generating device using the same provided by the present invention.
Figure 2:
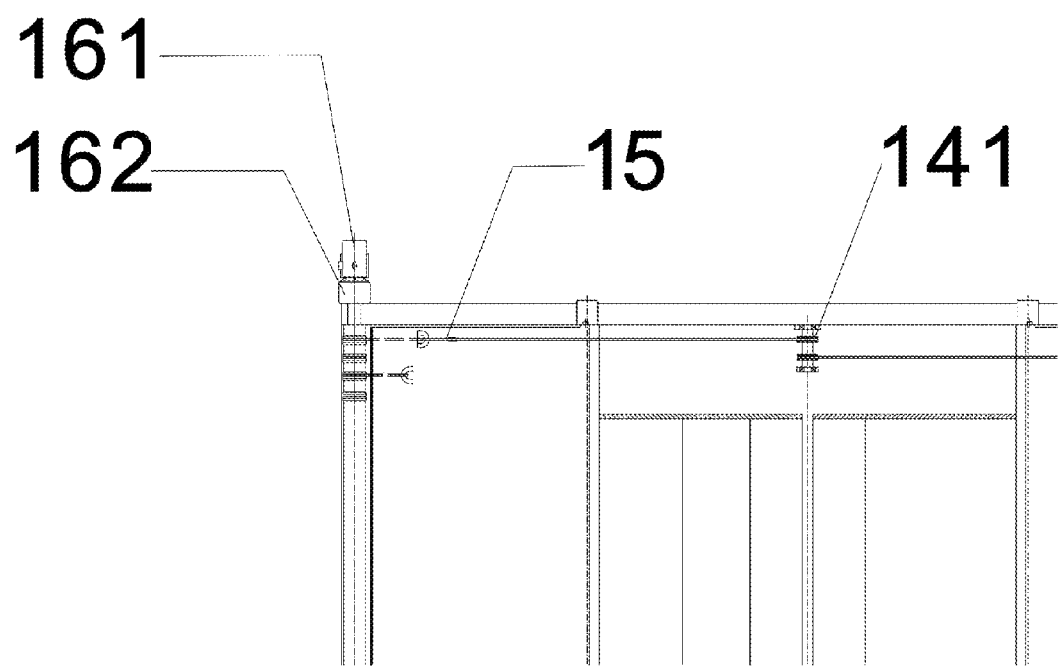
FIG. 2 is a partial enlarged view of FIG. 1.
Figure 3:
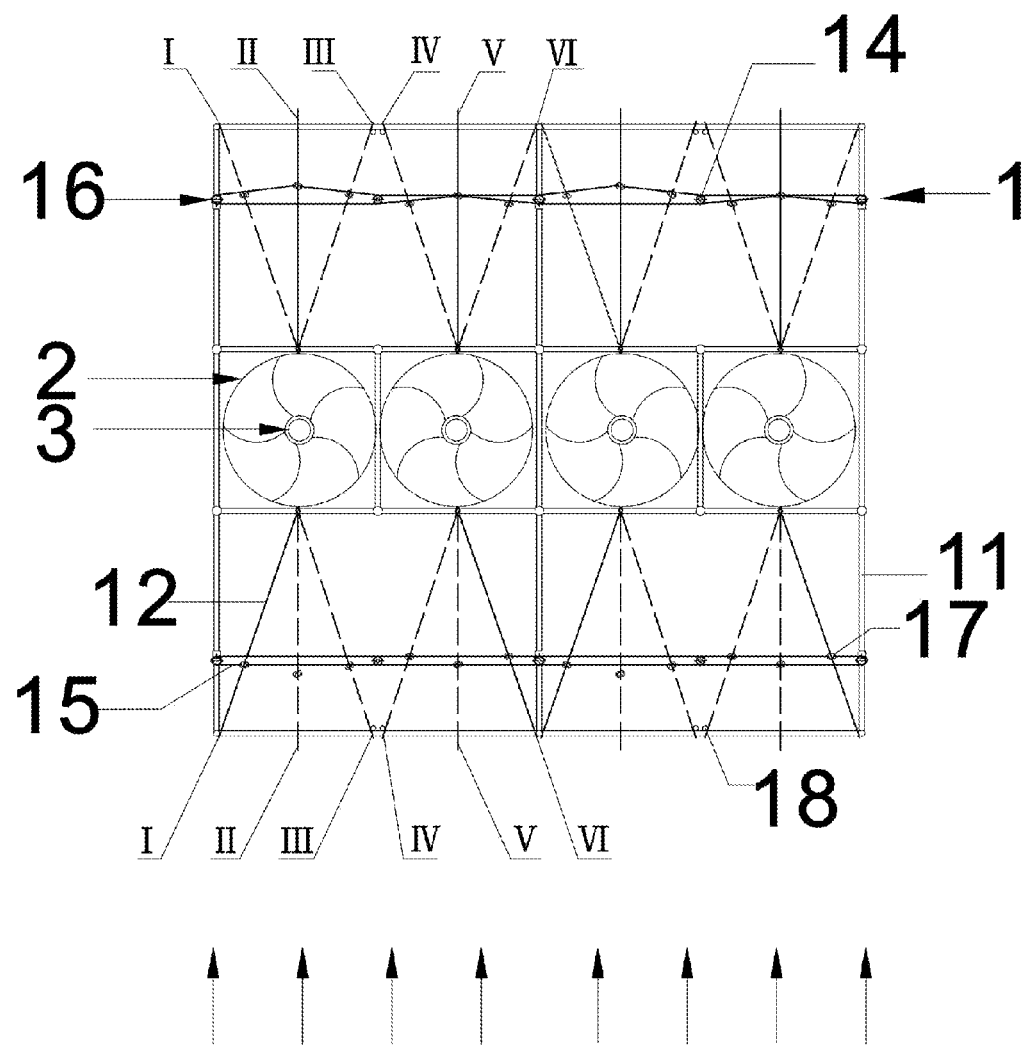
FIG. 3 is a top view showing the water flow regulating device and the ocean power generating device using the same provided by the present invention.
Figure 4:
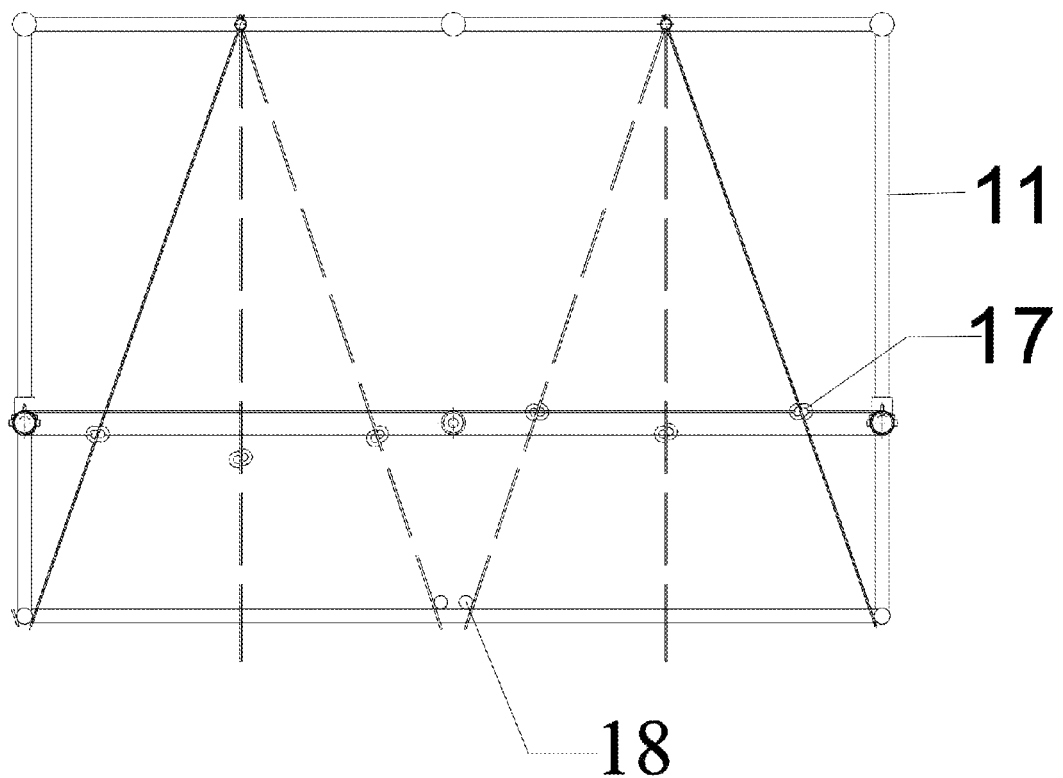
FIG. 4 is a partial enlarged view of FIG. 3.

FIG. 1 is a front view showing a water flow regulating device and an ocean power generating device using the same provided by the present invention. FIG. 2 is an enlarged view of FIG. 1. FIG. 3 is a top view showing the water flow regulating device and the ocean power generating device using the same provided by the present invention. FIG. 4 is an enlarged view of FIG. 3. Refer to FIGS. 1 to 4.

The ocean power generating device according to one embodiment of the invention includes a water flow regulating device 1, hydro turbines 2, and electric generators 3. The water flow regulating device 1 in the embodiment includes a main body 11, water deflectors 12, rotating shafts 13, winding shafts 14, ropes or cables 15, and driving units 16. The hydro turbines 2 are disposed in the main body 11. The electric generators 3 (not shown in FIG. 1) are connected with the hydro turbines 2, respectively.

In actual use, the water flow regulating device 1 of the invention is applied to the ocean power generator device, and the main body 11 can also be used as the frame of the ocean power generating device. In the embodiment, half of the main body 11 is welded by hollow steel pipes, and the other half is made up of H-shaped steel. Specifically, the upper half part of the main body 11 is welded by hollow steel pipes. Thus, the main body 11 is light, simply structured, easy to process and manufacture, convenient to install, adjust and dismantle, and applicable to engineering. Meanwhile, the main body 11 can provide buoyancy to the whole device. In addition, the lower half part of the main body 11 can be made of H-shaped steel to ensure that the gravity centre of the main body 11 is located at the lower half part, guaranteeing the overall stability of the main body 11.

The water deflectors 12 are pivotally connected with the main body 11. In the embodiment, the water flow regulating device 1 further includes stopping elements 18. The stopping elements 18 are disposed at the main body 11. In the embodiment, the hydro turbines 2 are disposed in the middle of the main body 11. The water deflectors 12 are pivotally connected with the main body 11 through shafts and located at the upper stream and lower stream of the hydro turbines 2. The hinged end of the water deflector 12 is disposed at a position close to the hydro turbine 2. The stopping element 18 is located at a position away from the hydro turbine 2. The distance between the stopping element 18 and the shaft is a little smaller than the length of the water deflector 12 so as to stop the water deflector 12. The water deflector 12 can be located at different positions by setting the stopping element 18 at different positions. In the embodiment, the upper stream and the lower stream of each hydro turbine 2 are respectively provided with a water deflector 12. However, the number of the water deflectors 12 is not limited in the present invention.

The rotating shafts 13 are rotatably disposed at the main body 11. The winding shafts 14 are disposed at the main body 11. In the embodiment, the winding shafts 14 are fixed to the main body 11. However, the present invention has no limitation in this aspect. In other embodiments, the winding shafts 14 may also be movably disposed at the main body 11. In the embodiment, the distance between the winding shaft 14 and the rotating shaft 13 is a little greater than the diameter of the around cross section of the hydro turbine 2. The present invention has no limitation in this aspect, too.

One end of the rope or cable 15 is fixed to the water deflector 12, and the other end bypasses the rotating shaft 13 and the winding shaft 14, goes back to the water deflector 12 and is fixed to the water deflector 12. In actual application, the rope or cable 15 can be wound on the rotating shaft 13 for a plurality of circles to realize stable withdrawal and release, while the rope or cable 15 is only required to be wound on the winding shaft 14 for approximately half a circle. In the embodiment, the water flow regulating device 1 further includes a fixed pulley 141 disposed at the winding shaft 14, and the rope or cable 15 bypasses the winding shaft 14 via the fixed pulley 141.

In the embodiment, the water flow regulating device 1 further includes fixing elements 17. The fixing elements 17 are fixed to the water deflector 12, and the two ends of the rope or cable 15 are respectively fixed to the water deflectors 12 via the fixing elements 17. In the embodiment, the fixing elements 17 are C-shaped fasteners. However, the present invention has no limitation in this aspect. In actual application, one end of the rope or cable 15 is tied at the fixing element 17, and the rope or cable 15 is wound on the rotating shaft 13 for a plurality of circles first, and then penetrates through the hole at the water deflector 12. Next, the rope or cable 15 bypasses the fixed pulley 141 to go back to another fixing element 17 on the other side of the water deflector 12 and then is fixed thereat. In other words, the rope or cable 15 starts from the water deflector 12, makes a circle and then goes back to the water deflector 12. The rope or cable 15 moves around to form a closed shape.

In the embodiment, the driving unit 16 is connected with the rotating shaft 13 to drive the rotating shaft 13 to rotate, such that the rope or cable 15 is driven to withdraw or release to control the water deflectors 12 to rotate. In the embodiment, the driving unit 16 includes a motor 161 and a speed reducer 162. The motor 161 is connected with the speed reducer 162. The speed reducer 162 is connected with the rotating shaft 13. In actual application, the rotation speed of the motor 161 is very high, but the withdrawal and release of the rope or cable 15 does not need the rotating shaft 13 to rotate quickly, so the motor 161 is connected with the rotating shaft 13 through the speed reducer 162.

In the embodiment, the rotation directions of the adjacent hydro turbines 2 in the ocean power generating device are opposite. Correspondingly, the adjacent water deflectors 12 are located at the axially symmetrical positions under the same condition. The ropes or cables 15 are withdrawn and released through rotation of the rotating shafts 13 such that the adjacent water deflectors 12 can be rotated to be located at three different positions: I and VI, II and V, and III and IV. The adjacent water deflectors 12 located at the lower stream are located at positions II and V in actual use.

When the adjacent water deflectors 12 on the upper stream are located at the positions I and VI, the water deflectors 12 guide the coming water flow to the direction vertical to the inner recess of the blades of the hydro turbines 2 to increase the impact force of the water flow on the hydro turbines 2, thereby speeding up the rotation of the hydro turbines 2 and improving the generation power of the electric generator 3. When the adjacent water deflectors 12 on the upper stream are located at the positions II and V, the water deflectors 12 have no effect on the water flow. When the adjacent water deflectors 12 on the upper stream are located at the positions III and IV, the water deflectors 12 guide the water flow to the direction opposite to that of the rotation of the hydro turbines 2 as much as possible, thereby preventing the overlarge instant output power of the electric generator 3 in cases a large ocean current suddenly rushes to the hydro turbines 2.

In the embodiment, the water flow regulating device further includes a processing unit 19. The processing unit 19 is electrically connected with the driving units 16. In actual application, the processing unit 19 may be wirelessly connected with the driving units 16 to send wireless control signals to the driving units 16, thereby controlling the rotation of the rotating shafts 13 and then realizing the automatic withdrawal and release of the ropes or cables 15. In the embodiment, the processing unit 19 may include a first detecting element for detecting the speed of the water flow and a second detecting element for detecting the positions of the water deflectors 12. The processing unit 19 can first set the thresholds of the flow speed to V1, V2, and V3 in the system.

When the first detecting element detects that the flow speed is smaller than or equal to V1, the processing unit 19 sends a control signal to the driving units 16. Then, the driving units 16 controls the rotating shafts 13 to rotate to drive the ropes or cables 15 to withdraw or release, so the water deflectors 12 are rotated. When the second detecting element detects that the adjacent water deflectors 12 on the upper stream are respectively located at the position I and the position VI as shown in FIG. 3, the processing unit 19 sends a stop signal to the driving units 16 to control the rotating shafts 13 to stop rotating.

When the first detecting element detects that the flow speed is greater than V1 and smaller than or equal to V2, the processing unit 19 controls a control signal to the driving units 16. Then, the driving units 16 controls the rotating shafts 13 to rotate to drive the ropes or cables 15 to withdraw or release, so the water deflectors 12 are rotated. When the second detecting element detects that the adjacent water deflectors 12 on the upper stream are respectively located at the position II and the position V as shown in FIG. 3, the processing unit 19 sends the stop signal to the driving units 16 to control the rotating shafts 13 to stop rotating.

When the first detecting element detects that the flow speed is greater than V2, the processing unit 19 sends a control signal to the driving units 16. In a similar way, when the second detecting element detects that the adjacent water deflectors 12 on the upper stream are respectively located at the position III and the position IV as shown in FIG. 3, the processing unit 19 sends the stop signal to the driving units 16 to control the rotating shafts 13 to stop rotating.

However, the present invention has no limitation on the control mode of the processing unit 19. In other embodiments, the processing unit 19 may not include the second detecting element. Since the distances between different positions of the water deflectors 12 (namely distances between the positions I and II, II and III, III and IV, IV and V, V and VI) are fixed values, when the water deflectors 12 are required to rotate from one position to another position, the corresponding rotation circles of the rotating shafts 13 can be preset before use of the water flow regulating device 1 in the invention. Therefore, even if the positions of the water deflectors 12 are not detected, the positions of the water deflectors 12 can be correctly controlled by setting the rotation circles of the rotating shafts 13 driven by the driving units 16.

In another embodiment, the first detecting element may detect the output generation power of the electric generators 3 instead of the flow speed. When the generation power is too large, the adjacent water deflectors 12 are controlled to be at the positions III and IV. When the generation power is too small, the adjacent water deflectors 12 are controlled to be at the positions I and VI. When the generation power is relatively appropriate, the adjacent water deflectors 12 are controlled to be at the positions II and V. However, the present invention has no limitation in this aspect. In other embodiments, the water flow regulating device may not include the processing unit 19. The control over the driving units 16 can be manually realized by directly visually measuring the water deflectors 12 by the user.

In conclusion, the water flow regulating device and the ocean power generating device using the same in the invention can guide the water flow to rush to the hydro turbines so as to regulate load on the hydro turbines. Therefore, the electricity generated by the ocean power generating device can be stably output and directly used, solving the problems of large fluctuation of the output power and poor stability of the traditional ocean power generating devices.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An ocean power generating device, comprising:
a water flow regulating device, comprising:
   a main body;
   a water deflector, pivotally connected with the main body;
   a rotating shaft, rotatably disposed in the main body;
   a winding shaft, disposed in the main body;
   a rope or cable, one end of the rope or cable fixed to the water deflector, a central portion being wound around the rotating shaft and the winding shaft, and another end fixed to the water deflector; and
   a driving unit, connected with the rotating shaft to rotate the rotating shaft such that the rope or cable is withdrawn or released,
wherein withdrawing or releasing the cable controls the position of the water deflector;
a hydro turbine, disposed in the main body; and
an electric generator, connected with the hydro turbine, wherein the water deflector guides water flow to the hydro turbine no matter what position the water deflector is located at, such that the hydro turbine always rotates.

2. The ocean power generating device according to claim 1, wherein the water flow regulating device further comprises a processing unit electrically connected with the driving unit.

3. The ocean power generating device according to claim 1, wherein the water flow regulating device further comprises a stopping element disposed in the main body.

4. The ocean power generating device according to claim 1, wherein the water flow regulating device further comprises a fixing element, the fixing element is fixed to the water deflector, and the two ends of the rope or cable are respectively fixed to the water deflector via the fixing element.

5. The ocean power generating device according to claim 1, wherein the driving unit comprises a motor and a speed reducer, the motor is connected with the speed reducer, and the speed reducer is connected with the rotating shaft.

6. The ocean power generating device according to claim 1, wherein the water flow regulating device further comprises a fixed pulley disposed at the winding shaft, the rope or cable wound around the winding shaft via the fixed pulley.

* * * * *